United States Patent
Guda Subhash (10) Patent No.: US 12,510,963 B2
(45) Date of Patent: Dec. 30, 2025

(54) HUMAN-COMPUTER INTERFACE SYSTEM AND METHOD FOR SELECTING TARGETS

(71) Applicant: Rajshekar Guda Subhash, San Jose, CA (US)

(72) Inventor: Rajshekar Guda Subhash, San Jose, CA (US)

(*) Notice: Subject to any disclaimer, the term of this patent is extended or adjusted under 35 U.S.C. 154(b) by 0 days.

(21) Appl. No.: 18/931,882

(22) Filed: Oct. 30, 2024

(65) Prior Publication Data

US 2025/0155972 A1    May 15, 2025

Related U.S. Application Data

(60) Provisional application No. 63/598,093, filed on Nov. 11, 2023.

(51) Int. Cl.
*G06F 3/01* (2006.01)

(52) U.S. Cl.
CPC .............. *G06F 3/013* (2013.01); *G06F 3/015* (2013.01); *G06F 3/016* (2013.01)

(58) Field of Classification Search
None
See application file for complete search history.

(56) References Cited

U.S. PATENT DOCUMENTS

| | | |
|---|---|---|
| 10,795,441 B2 | 10/2020 | Lee et al. |
| 10,901,509 B2 | 1/2021 | Aimone et al. |
| 11,402,909 B2 | 8/2022 | Forsland et al. |
| 2014/0347265 A1* | 11/2014 | Aimone ............. G06F 3/015 345/156 |
| 2018/0103917 A1 | 4/2018 | Kim et al. |
| 2020/0289016 A1 | 9/2020 | Lukyanenko et al. |
| 2022/0404910 A1 | 12/2022 | Alcaide et al. |

FOREIGN PATENT DOCUMENTS

| | | |
|---|---|---|
| EP | 4155880 A1 | 3/2023 |
| KR | 10-2022-0098021 A | 7/2022 |
| KR | 10-2023-0075079 A | 5/2023 |
| WO | 2020061358 A1 | 3/2020 |
| WO | 2020159784 A1 | 8/2020 |
| WO | 2021121766 A1 | 6/2021 |
| WO | 2021140247 A1 | 7/2021 |
| WO | 2021247312 A1 | 12/2021 |

OTHER PUBLICATIONS

Shishkin SL, Zhao DG, Velichkovsky BM, Isachenko AV. Gaze-and-brain-controlled interfaces for human-computer and human-robot interaction. Psychology in Russia. 2017;10(3):120.
Jantz J, Molnar A, Alcaide R. A brain-computer interface for extended reality interfaces. InACM SIGGRAPH 2017 VR Village Jul. 30, 2017 (pp. 1-2).

* cited by examiner

*Primary Examiner* — Carl Adams (57) ABSTRACT

A human-computer interface system and method for target selection on a computer-generated display includes an eye-tracking unit configured to capture gaze patterns of a user, a neural signal capture unit configured to detect neural signals (such as electroencephalogram (EEG) signals) from the user, and a processing unit. The processing unit is configured to analyze the gaze patterns and neural signals to identify an anticipatory negative potential associated with the user's intent to select a particular target, and to initiate a target selection based on the identified anticipatory negative potential.

14 Claims, 6 Drawing Sheets

HUMAN-COMPUTER INTERFACE SYSTEM AND METHOD FOR SELECTING TARGETS

CROSS-REFERENCE TO RELATED APPLICATIONS

This application claims the benefit of the prior filing date of U.S. Provisional Application No. 63/598,093 filed 11 Nov. 2023, which is hereby incorporated by reference in its entirety.

FIELD OF THE INVENTION

The present invention relates to the field of human-computer interfaces, and more particularly, to interfaces that allow a user to select a target object from options presented on a display.

BACKGROUND OF THE INVENTION

Brain-computer interfaces (BCIs) have emerged as a promising technology for enabling direct communication between the human brain and external devices. These systems interpret neural signals to control computers, prosthetics, or other machines, offering new possibilities for human-computer interaction.

Extended reality (XR) environments, which encompasses virtual reality, augmented reality, and mixed reality, have been used in fields such as gaming, education, and professional training, where they are intended to provide an immersive experience. Gaze-based interactions have been employed to interact with XR environments, and may employ techniques such as dwell-time thresholds or additional confirmation gestures made by the user to confirm selections made by a user.

SUMMARY OF THE INVENTION

A human-computer interface system for selecting a target presented on a display can employ an eye-tracking unit configured to capture gaze patterns of a user, a neural signal capture unit configured to detect neural signals dependent on brain electrical activity from the user, and a processing unit. The processing unit can be configured to analyze the gaze patterns to identify user fixation on a particular displayed target, to analyze the neural signals to identify an anticipatory negative potential associated with the user's intent to select the particular target, and to initiate a target selection of the particular target based, at least partially, on the identified anticipatory negative potential. The anticipatory negative potential may comprise a Stimulus-Preceding Negativity (SPN) and/or a Contingent Negative Variation (CNV). The gaze patterns may comprise one or more of gaze coordinates, gaze direction, gaze origin vectors, pupil dilation, pupil dilation/constriction rate, saccade velocity, gaze velocity, fixation duration, saccade amplitude, and/or micro-saccade distribution. The system may have a feedback unit configured to provide feedback to the user in response to the initiated target selection, such feedback including one or more of visual feedback, audio feedback, and/or tactile/haptic feedback. Such feedback may include or consist of a change in at least one visual characteristic of the selected target. The processing unit may employ a real-time prediction model to analyze the gaze patterns and neural signals to predict an intention to select the particular target, and to initiate a target selection of the particular target based at least partially on the predicted intention to select.

A method for selecting a target presented on a display may include the steps of capturing gaze patterns of a user using an eye-tracking unit, detecting neural signals of the user using a neural signal capture unit, analyzing the gaze patterns and neural signals to identify an anticipatory negative potential associated with the user's intent to select a particular target, and initiating a target selection of the particular target based, at least partially, on the identified anticipatory negative potential. The anticipatory negative potential may comprise a Stimulus-Preceding Negativity (SPN) and/or a Contingent Negative Variation (CNV). The gaze patterns may comprise one or more of gaze coordinates, gaze direction, gaze origin vectors, pupil dilation/constriction rate, saccade velocity, gaze velocity, fixation duration, saccade amplitude, and/or micro-saccade distribution. The method may include providing feedback to the user in response to the initiated target selection, such feedback including one or more of visual feedback, audio feedback, and/or tactile/haptic feedback. Such feedback may include or consist of changing at least one visual characteristic of the selected target. The method may include employing a real-time prediction model to analyze the gaze patterns and neural signals to predict an intention to select the particular target, and to initiate a target selection of the particular target based at least partially on the predicted intention to select.

A non-transitory computer-readable medium can store instructions that, when executed by a processor, cause the processor to perform a method for selecting a target presented on a display, where the method can include the steps of receiving gaze patterns of a user from an eye-tracking unit, receiving neural signals of the user from a neural signal capture unit, analyzing the gaze patterns and neural signals to identify an anticipatory negative potential associated with the user's intent to select a particular target, and initiating a target selection of the particular target based, at least partially, on the identified anticipatory negative potential. The anticipatory negative potential may comprise a Stimulus-Preceding Negativity (SPN) and/or a Contingent Negative Variation (CNV). The gaze patterns may comprise one or more of gaze coordinates, gaze direction, gaze origin vectors, pupil dilation/constriction rate, saccade velocity, gaze velocity, fixation duration, saccade amplitude, and/or micro-saccade distribution. The method may include providing feedback to the user in response to the initiated target selection, the feedback including one or more of visual feedback, audio feedback, and/or tactile/haptic feedback. The feedback may include a change in at least one visual characteristic of the selected target. The method may employ a real-time prediction model to distinguish between intentional target selections and spontaneous gaze fixations on a particular target based on the gaze patterns and neural signals to predict an intention to select the particular target, and to initiate a target selection of the particular target based at least partially on the predicted intention to select.

BRIEF DESCRIPTION OF THE DRAWINGS

A further understanding of the nature and advantages of particular embodiments may be realized by reference to the remaining portions of the specification and the drawings, in which like reference numerals are used to refer to similar components. When reference is made to a reference numeral without specification to an existing sub-label, it is intended to refer to all such multiple similar components.

Corresponding reference characters indicate corresponding parts throughout the several views. The exemplifications set out herein illustrate embodiments of the invention and such exemplifications are not to be construed as limiting the scope of the invention in any manner.

DETAILED DESCRIPTION

According to an aspect of the present disclosure, a method for target selections using an integrated oculomotor-brain-computer interface platform is provided. Such method may be used for various computing environments, and may have particular utility for use in an extended reality (XR) environment. The method includes capturing gaze patterns while a user views the environment and determining when the gaze of the user is "fixated" on a particular target; that is, the gaze pattern indicates that the visual attention of the user is focused on that particular target. The method includes tracking the user's neural activity by analyzing electrical brain signals (typically monitored by electroencephalogram (EEG) and/or magnetoencephalogram (MEG); for purposes of discussion, the following descriptions use the example of EEG signals, but other signals responsive to electrical activity in the brain could be employed). The method includes determining whether or not to select the target upon which the user's gaze is currently fixated based, at least partially on the detected neural signals.

Typically, the determination is based at least partially on whether the neural signals show an anticipatory negative potential (sometimes referred to as an "expectancy wave" or "e-wave"), which indicates a reduction in brain electrical activity. Such negativity is believed to result from the brain quieting the neural activity to process the upcoming stimulus (expected to result from the selection action) more efficiently. In a simple example, when a prominent negativity in the neural signals occurs following the user's "fixation" on a particular target, the method may then proceed to select the fixated target, and where such negativity does not exist or is only minimal, the fixated target is not selected. Examples of such negativity are anticipatory negative potentials including Stimulus-Preceding Negativity (SPN) and Contingent Negative Variation (CNV). The Stimulus-Preceding-Negativity (SPN) is a type of event-related potential (ERP) that is observed in the brain's electrical activity. Contingent Negative Variation (CNV) is a negative deflection in the neural signal that occurs after the presentation of a stimulus and before the onset of the motor response. Correspondingly, the SPN is a negative slow surface potential (typically measured by EEG) that occurs during the period between a warning stimulus or signal and an imperative stimulus. Such anticipatory negative potentials vary in timing, duration, and magnitude dependent on the user, the type of target, and multiple other factors, and thus accuracy may be improved by calibrating the method for a particular user. As used herein, "anticipatory negative potential" is used to refer to any response in neural signals that indicate a quieting of brain electrical activity. The method may include providing feedback to the user in response to the captured neural activity and gaze patterns; such feedback could be provided through an interactive environment presented to the user. While visual and/or audio feedback are readily provided by a typical interactive environment, in some cases tactile/haptic feedback could be employed. In some cases, a fall-back method of selection (such as verbal command, extended gaze-based or head-orientation based dwell time, hand gestures, physical button or key, etc.) can be provided to allow the user to make selections in the case of a false negative in detecting an anticipatory negative potential when the user intends to select the target. Similarly, a de-selection option could be provided to allow the user to cancel a selection resulting from a false positive determination of intention to select the target when the user did not so intend. Deselection could be fully or partially automated, such as by using Error-related potentials (ErrP) from the pre-frontal cortex. In such a case, if the ErrP (or other neural activity signal indicative of no intention to select the current target) is detected soon after the system selects the target, then the selection can be indicated as a false positive selection. Where the method (or system) has the capacity to adjust the criteria used to determine an intention to select, such false negatives and/or false positives can be used to instruct the determination criteria to improve accuracy/reliability.

According to other aspects of the present disclosure, the method may include one or more of the following features. The gaze patterns may include any reactions of the user's eye(s) to displayed stimuli that are detectable by an eye-tracking unit, and can include, for example, gaze dynamic features derived from gaze coordinates, gaze direction, or gaze origin vectors, as well as eye reactions such as pupil dilation, saccade velocities, gaze velocities, gaze dispersion, fixation duration, pupil responses, rate of change of pupil size, saccade amplitudes, and micro-saccade distribution (all such eye reactions hereafter being discussed as simply "gaze patterns"). As an alternative to tracking eye reactions to stimuli, the method (or system) in some cases could employ head gaze, such as by using an accelerometer and gyroscope that respond to changes in the user's head orientation, to detect the direction that the user's head is pointed (which is assumed to correspond to the direction the user is looking); for conciseness, such head orientation changes are included under "gaze patterns" and the apparatus used to determine head gaze direction/orientation are included under the term "eye-tracking unit" (even though the measurements captured do not directly respond to eye reactions). As one example, the display may show the user a cursor (such as a reticle) that the user can move through the display by moving their head to place the cursor over the desired target. The method may include providing feedback to the user for the intentional selection of the target and/or to indicate when the visual attention of the user is fixated on a particular target (such as displaying a change to the target appearance). During such fixation, even if the appearance of the target is changed, a minimum negativity or no negativity may be detected, indicating that eliciting the anticipatory negative potential is dependent on the user's intention to select the target. The method may adapt to the user's faster selection response once the user acclimatizes to the target locations.

According to another aspect of the present disclosure, an integrated oculomotor-brain-computer interface system for making target selections, such as in a computer-generated environment, is provided. The system can employ an eye-tracking unit which is configured to track user eye reactions such as gaze patterns while a user gazes at a display including at least one target, and the gaze patterns can be interpreted to detect when the gaze of user is "fixated" on a particular target. Herein, the eye-tracking unit is described as being coupled with or incorporated into a head-mounted display (HMD), which may configured to present an interactive environment to the user (while various devices could serve as display devices, for purposes of discussion, the following disclosure frequently refers simply to a HMD). The system can include a neural signal capture unit integrated with an electroencephalogram (EEG) configured to capture the user's neural activity (which could be monitored from the point the user gazes at the target or at any other time). The system can employ a processor that is configured to determine whether to select or not select the target that the user is currently fixated on, based at least partially on the captured neural signals. For example, if the neural signals indicate the presence of an anticipatory negative potential, the processor may proceed to select the fixated target, and not select the target if prominent negativity does not exist. The negativity may, for example, refer to anticipatory negative potentials including Stimulus-Preceding Negativity (SPN) and/or Contingent Negative Variation (CNV). The system may include a feedback unit configured to provide visual and/or audio feedback to the user in response to the neural activity captured by the neural signal capture unit and/or the gaze features captured by the eye-tracking unit. The feedback could be provided to the user through the HMD (or other display being employed). Note that while particular hardware is discussed for purposes of illustration, the scope of the system is not dependent on the particular examples described.

The foregoing general description of the illustrative embodiments and the following detailed description thereof are merely exemplary aspects of the teachings of this disclosure and are not restrictive.

While various aspects and features of certain examples have been summarized above, the following detailed description illustrates a few exemplary methods and systems in further detail. The described examples are provided for illustrative purposes and are not intended to limit the scope of the invention.

In the following description, for the purposes of explanation, numerous specific details are set forth to provide a thorough understanding of the described examples. While various features are ascribed to different examples, it should be appreciated that the features described with respect to one example may be incorporated with other examples as well. By the same token however, no single feature or features of any described example should be considered essential to every example, as other examples may omit such features.

In this application the use of the singular includes the plural unless specifically stated otherwise and use of the terms "and" and "or" is equivalent to "and/or," also referred to as "non-exclusive or" unless otherwise indicated. Moreover, the use of the term "including," as well as other forms, such as "includes" and "included," should be considered non-exclusive. Also, terms such as "element" or "component" encompass both elements and components including one unit and elements and components that include more than one unit, unless specifically stated otherwise.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

The following description sets forth exemplary aspects of the present disclosure. It should be recognized, however, that such description is not intended as a limitation on the scope of the present disclosure. Rather, the description also encompasses combinations and modifications to those exemplary aspects described herein.

Figure 1A:
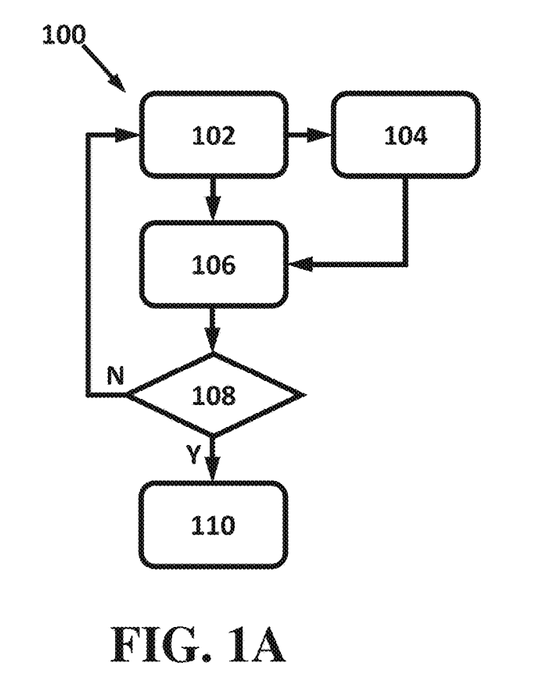
FIGS. 1A-1C are flowcharts showing examples of methods for selecting a target from one or more displayed targets.

The present disclosure provides a system and method for facilitating intuitive target selection, which may be used for various computer-generated displays, and should be particularly suitable for use in extended reality (XR) environments. This can achieved by employing an oculomotor-brain-computer interface platform that leverages both gaze patterns and neural signals. One example of a method 100 of selecting a target is shown in FIG. 1A. In step 102 of the method 100, the gaze patterns of a user are captured by an eye-tracking unit while a user gazes at a display. Such gaze patterns may include features such as gaze dynamic features derived from gaze coordinates, gaze direction, or gaze origin vectors, and eye reactions such as pupil dilation, saccade velocities, gaze velocities, fixation duration, saccade amplitudes, and micro-saccade distribution, and any other eye reactions detectable by the eye-tracking unit. The gaze patterns are analyzed in step 104 to identify when the gaze of the user is fixated on a particular target presented on the display (which may change the appearance of the target to indicate to the user that their gaze is fixated on it). As used herein, "fixated" means that the gaze patterns indicate that the visual attention of the user is focused on a particular target, not necessarily that the gaze of the user is fixed.

The neural activity of the user is detected (step 106) using a neural signal capture unit, such as by monitoring electroencephalogram (EEG) signals and/or magnetoencephalogram (MEG) signals (for conciseness, EEG signals are used as an example in the following discussion). The neural activity detection (step 106) could be performed continually along with the gaze pattern capture and analysis (steps 102 & 104), or could only be initiated at the time the user is determined in step 104 to be fixated on a particular target (this latter approach may reduce processing requirements). The neural signals detected in step 106 are analyzed (step 108) to determine whether an anticipatory negative potential is present. If not, no selection action is made and the process continues monitoring the user's gaze patterns (steps 102 & 104) and neural activity (step 106). If an anticipatory negative potential is indicated by the neural signal in step 108, then selection is initiated (step 110) of the target on which the user is currently fixated (as determined by analyzing the gaze pattern in step 104). The anticipatory negative potential detected could be negative slow-wave potentials, such as Stimulus-Preceding Negativity (SPN) and/or Contingent Negative Variation (CNV), indicating a reduction in neural activity. If prominent negativity is detected in the neural signals in step 108, the system proceeds to select the target in step 110; otherwise, the process repeats without selecting the target. The response of the selection initiated in step 110 will depend on the nature of the display and targets; in a typical example, multiple targets may be presented, each of which represents a particular software control option that can be chosen, and in step 110 the control option associated with the particular target upon which the user's gaze is fixated is implemented. Note that an alternative approach would be to monitor and analyze the user's neural signals (steps 106 & 108) and then capture and analyze gaze patterns (steps 102 & 104) in response to a determination that the user intends to select a target, to determine at that time which target the gaze of the user is fixated on.

Figure 1B:
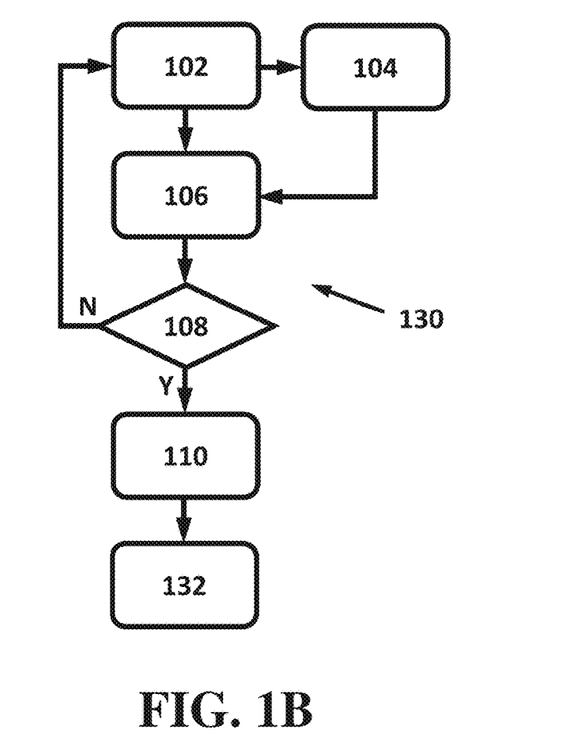

FIG. 1B illustrates a method 130 that is similar to the method 100, but where the step 110 of initiating selection of the target is accompanied by providing (step 132) the user feedback that such selection has been initiated. Such feedback could be visual feedback (such as changing a visual characteristic of the selected target, such as color, shape, brightness, outline, etc.) and/or could be audio feedback, such as playing a confirmation tone or message. Where the method is used for target selection in an interactive XR environment, the feedback can be presented via the XR environment. Feedback could also be employed to indicate fixation on a particular target (as determined in step 104), to inform the user that they are fixated on a particular target which will then be selected if the user intends to select it, resulting in changes to their neural signals that are detected and analyzed in steps 106 and 108.

Figure 1C:
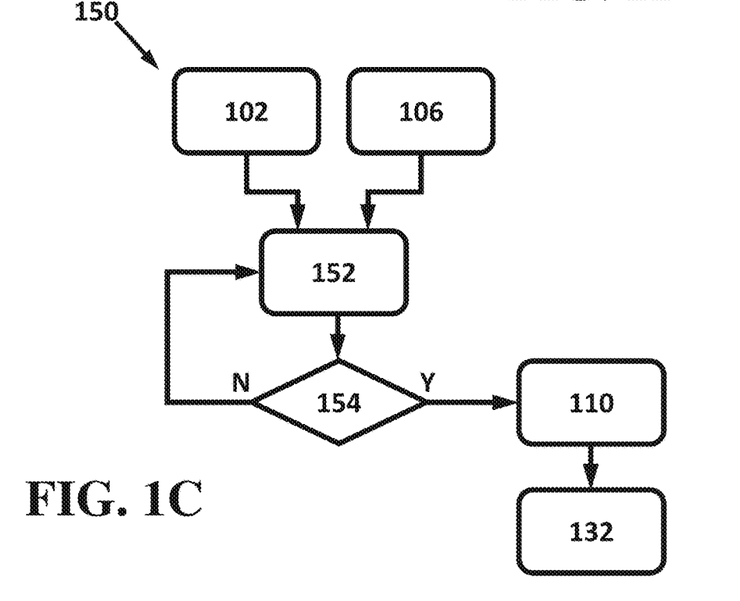

FIG. 1C illustrates a method 150 in which gaze patterns (monitored in step 102) and neural signals (detected in step 106) are used in combination by a real-time prediction model that is employed (step 152) to analyze the gaze patterns and neural signals to predict (step 154) an intention by the user to select a particular target upon which the gaze of the user is currently fixated. If no selection is predicted, the real-time prediction model continues to analyze (step 152) the data from the gaze monitoring (step 102) and neural signal monitoring (step 106). If an intention to select is predicted in step 154, then initiation of the selection is made (step 110) and, optionally, feedback of the initiation is provided to the user (step 132). The real-time prediction model may operate primarily by detecting prominent negativity in the neural signals to identify a potential target selection, and using gaze pattern information (such as dwell time fixated upon the target) to refine the potential selection and avoid false negatives. The prediction model may employ machine learning techniques to refine potential selections. The real-time prediction model may be able to select targets within 1-2 seconds of the user's gaze fixating on a particular target, and more preferably within 300-500 ms or shorter times. For example, once it is identified that the user is looking at a particular target, the neural activity and gaze patterns of the user could be processed by the prediction model and classified as to whether to select or not select the target, with such determination made within this time frame. Where the system provides a fallback option of allowing a user to independently select a target and/or an option for the user to de-select a target by taking a deliberate action, the user's actions in selecting and/or de-selecting a target can be used by the prediction model to refine its criteria for making a determination of intention to select. Where the user employs a fallback option to select a target (which the prediction model failed to select based on the user's gaze pattern and neural signal data), the prediction model notes this false negative and takes it into account when making further predictions, such as adjusting the prediction criteria in view of the user data which were collected at the time (for example, lowering the threshold of change for determining that an anticipatory negative potential has occurred). Similarly, where the user opts to de-select a target (which the prediction model predicted that the user intended to select), the prediction model can adjust its prediction criteria to account for this false positive (for example, raising the threshold of change for determining that an anticipatory negative potential has occurred).

Figure 2A:
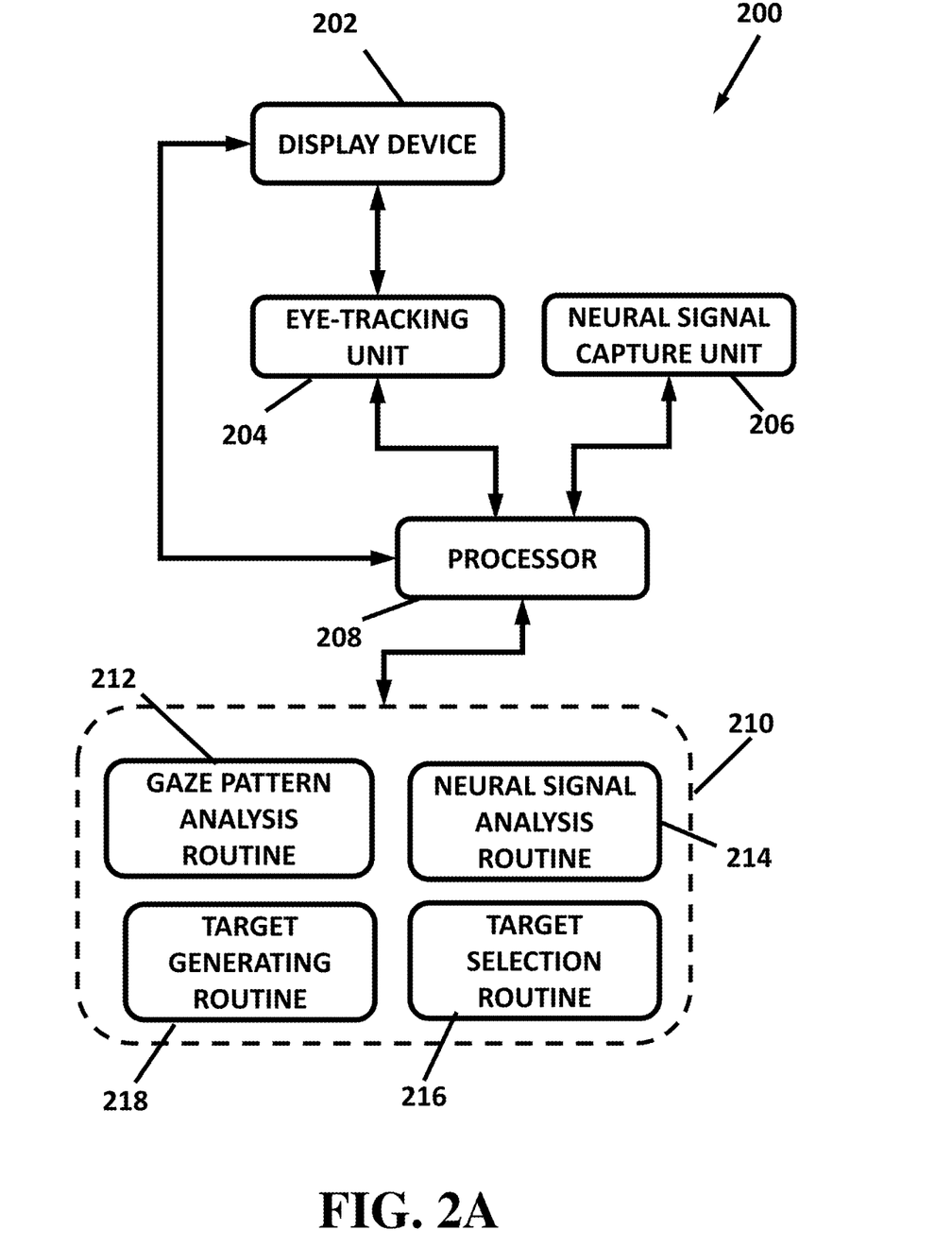
FIGS. 2A & 2B are block diagrams showing components of two examples of systems for selecting a target.

FIG. 2A illustrates one example of a system 200 for allowing a user to select a target. The system employs a display device 202 (which may be a dedicated part of the system 200 or a pre-existing display device that is responsive to the system 200, and may be any conventional display device such as a laptop, desktop, mobile device, or head-mounted display), an eye-tracking unit 204 that captures gaze patterns of the user, and a neural signal capture unit 206 that captures neural signals from the user. The eye-tracking device 204 may, for example, be an eye-tracker or an electromyography (EMG)-based device, configured to determine the user's gaze pattern (such as based on criteria as discussed above with regard to the method examples). The neural signal capture unit 206 may be an electroencephalogram (EEG), magnetoencephalogram (MEG), or any other suitable brain-imaging device used to monitor the user's neural activity (the examples are discussed in terms of EEG signals).

A processor 208 receives information from the eye-tracking unit 204 and the neural signal capture unit 206, and communicates with the display 202, which displays at least one visual target (one example of such a display is discussed below with reference to FIG. 3). In the system 200, the processor 208 controls the presentation provided to the user via the display device 202. The processor 208 may also perform conventional functions of a computerized system, such as real-time signal processing and handling the logic and communication between the components.

The processor 208 operates in conjunction with a library of routines 210. The routines can include a gaze pattern analysis routine 212, which operates on the signals received from eye-tracking unit 204 to allow the processor 208 to determine when the gaze of the user is "fixated" (i.e., the user's attention is focused) on a particular target presented on the display 202. This visual focus may act as a cursor, indicating which target or button the user is currently looking at in the XR environment. Note that some or all functions of the gaze patterns analysis routine 212 could be incorporated into the eye-tracking unit 204.

A neural signal analysis routine 214 operates on the signals received from neural signal capture unit 206 to allow the processor 208 to detect neural signals (such as anticipatory negative potential) indicative of the user's intention to select the particular target upon which their gaze is currently fixated. A target selection routine 216 can be used by the processor 208 to determine, based on the neural signal analyzed by the neural signal analysis routine 214, when the user intends to select the currently-fixated target. In some cases, the routines 214 and 216 may be integrated into a single routine, and some or all of their functions could be incorporated into the neural signal capture unit 206. Such determination of an intention to select can be made by detecting anticipatory negative potentials such as the Stimulus-Preceding Negativity (SPN) or the Contingent Negative Variation (CNV). These anticipatory potentials are evoked when the user anticipates a forthcoming stimulus.

In response to the determination by the target selection routine 216 that the user intends to select the currently-fixated target, the processor 208 can take an appropriate action that is associated with the selected target, such as implementing a menu option represented by the target. Optionally, a target generating routine 218, which can be used by the processor 208 to generate the display of one or more targets on the display device 202, can change the visual appearance of the selected target responsive to the target selection routine 216, thereby providing the user with feedback that the target has been selected (as discussed above, other feedback types could be employed). The target generating routine 218 could also change the visual appearance of a target upon which the gaze of the user is fixated prior to a selection being determined by the target selection routine 216, to indicate to the user which target their attention is fixated on.

Figure 2B:
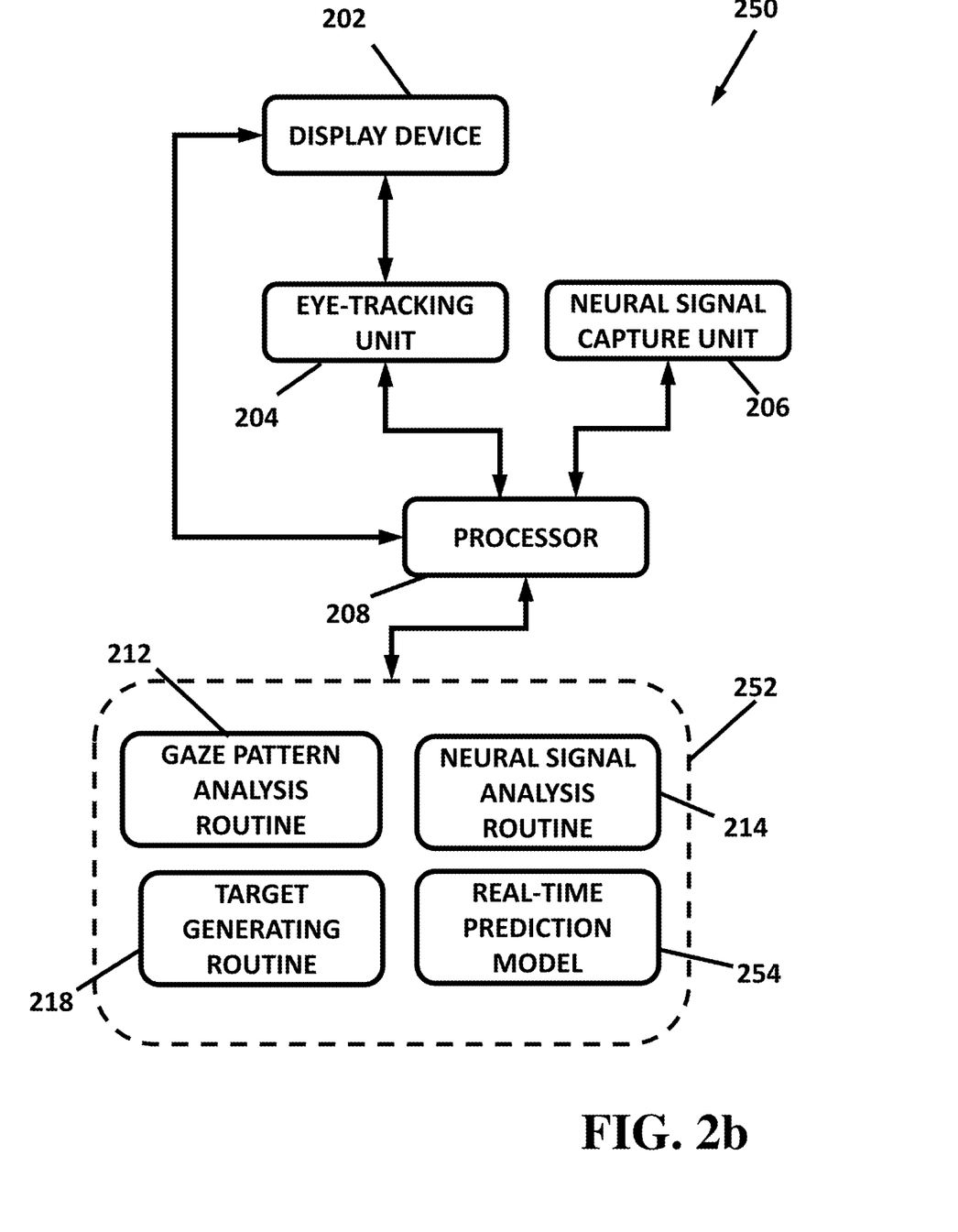

FIG. 2B illustrates another example of a system 250 for selecting a target, which shares many features in common with the system 200. The system 250 has a routines & applications library 252 which contains a real-time prediction model 254 which replaces the target selection routine 216. While shown as an application employed by the processor 208, some or all of the function of the real-time prediction model 254 could be provided by a separate processing component that communicates with the processor 208. The prediction model 254 may operate based on machine learning algorithms, reinforcement learning, deep learning, transformer models, and/or other suitable predictive techniques, and can be trained to classify the presence or absence of an anticipatory negative potential in the signals received from neural signal capture unit 206. The prediction model 254 may also incorporate gaze-derived metrics, such as fixation duration, saccade amplitude, gaze velocity, and others, to improve the accuracy of the prediction by considering signals received from eye-tracking unit 204, such as to avoid false positives.

Figure 3:
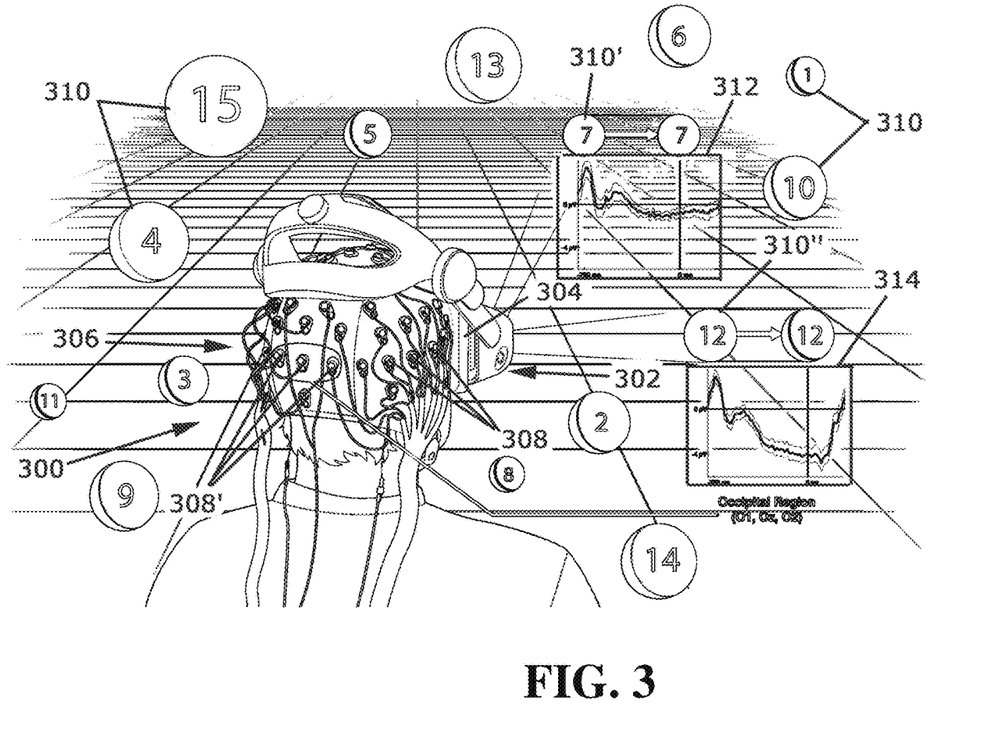
FIG. 3 is rendering showing one example of a system for selecting a target and a simulated display, as well as graphs showing sample EEG response graphs for cases where a target is passively observed but not selected and where a target is intentionally selected.

FIG. 3 is a graphic rendering illustrating some features of a system 300 for selecting a target. The system 300 has a display device 302, which in this case is provided in the form of a head-mounted display that is integrated with an eye-tracking unit 304 that monitors gaze patterns of the user as the user views a display provided by the display device 302. A neural signal capture unit 306 is provided, having an array of electrodes 308 arranged on the head of the user to respond to the neural signal generated by the user while viewing the presentation of the display device 302. The electrodes 308 typically include a number of occipital electrodes 308', positioned to respond to signals generated by the occipital lobe of the user's brain (responsible for visual perception).

FIG. 3 illustrates one example of a presentation that could be provided by the display device 302, the presentation including a number of visual targets 310 presented in a virtual environment. The targets 310 illustrated are numbered targets, which could be used in a challenge where the user selects targets in sequential order by target number (either ascending order or descending order) or is tasked with observing characteristics of the targets without selecting them. A processor (which could be similar to processor 208 shown in FIGS. 2A and 2B) can respond to the eye-tracking unit 304 to determine when the user has fixated on a particular target, such as target 310'. The processor may then direct the display device 302 to change the visual appearance of the target 310' to prompt the user to respond in either selecting or not selecting the target 310'. In the case of target 310', the user does not opt to select the target 310', and an EEG graph 312 of corresponding signals received by neural signal capture unit 306 does not indicate a negative potential associated with a mental decision to select. The unselected target 310' may continue to display a changed appearance so long as the gaze of the user remains fixated on it, or may revert to its original appearance after a prescribed time. In contrast, target 310" represents a target that the user intends to select. Again, once the processor determines from the eye-tracking unit 304 that the gaze of the user is fixated on the target 310", the processor directs the display device 302 to change the visual appearance of the target 310". In this case, the changed appearance provides an indication to the user of their visual attention being focused on the target. The neural response to the user's intention to select the target 310" generates a negative potential (as indicated on EEG graph 314) that is received by neural signal capture unit 306 and used by the processor to determine that the user intends to select the target 310". The processor then initiates an action appropriate to the selection (such as implementing a command option represented by the target 310") and may provide feedback to the user confirming the selection by providing a visual and/or audio indication via the display device 302. Note that the EEG graphs (312, 314) are shown in FIG. 3 for illustrative purposes, and typically would not be a part of the presentation displayed to the user. While FIG. 3 illustrates a relatively complex display, it should be noted that the present systems and methods could be employed for relatively simple displays, even as simple as a 2-dimensional display presenting only a single target, where the user's gaze pattern and neural signals could be used to determine the user's intention to select the target or not select it.

Figure 4A:
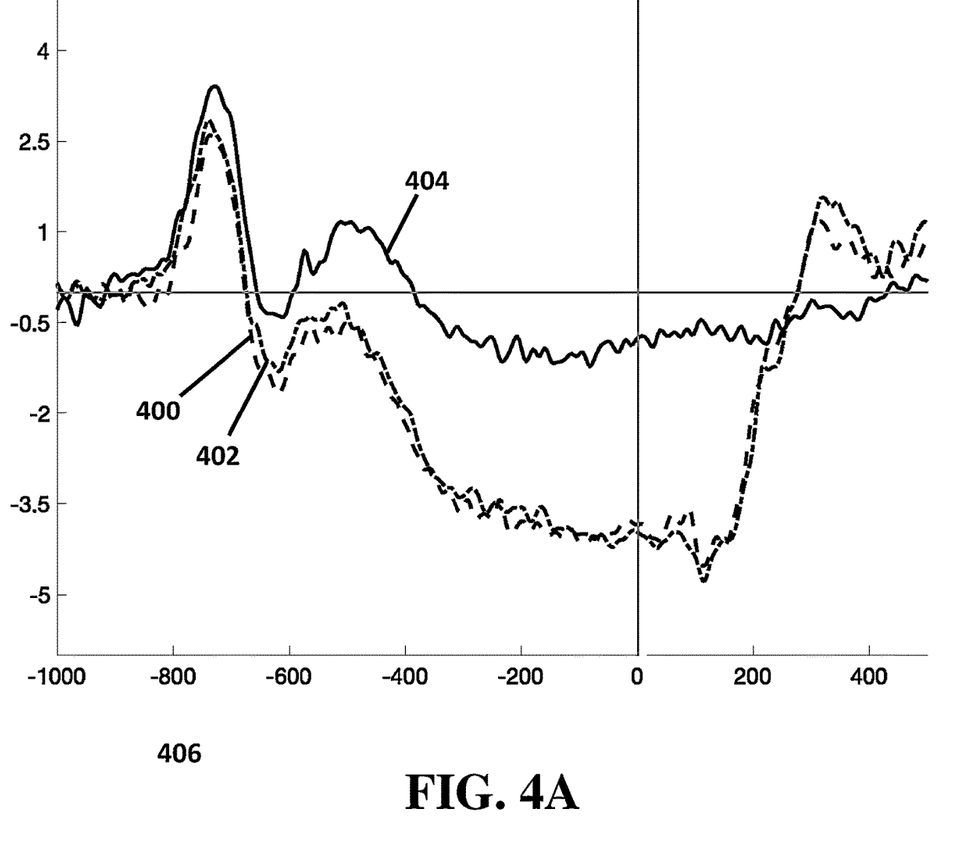
FIGS. 4A & 4B are graphs comparing the EEG response for three occipital electrodes comparing situations where the user intends to select a target (for numbered targets selected in ascending and descending order) versus where the user only intends to observe a target without selecting it (without feedback in FIG. 4A and with feedback in FIG. 4B).
Figure 4B:
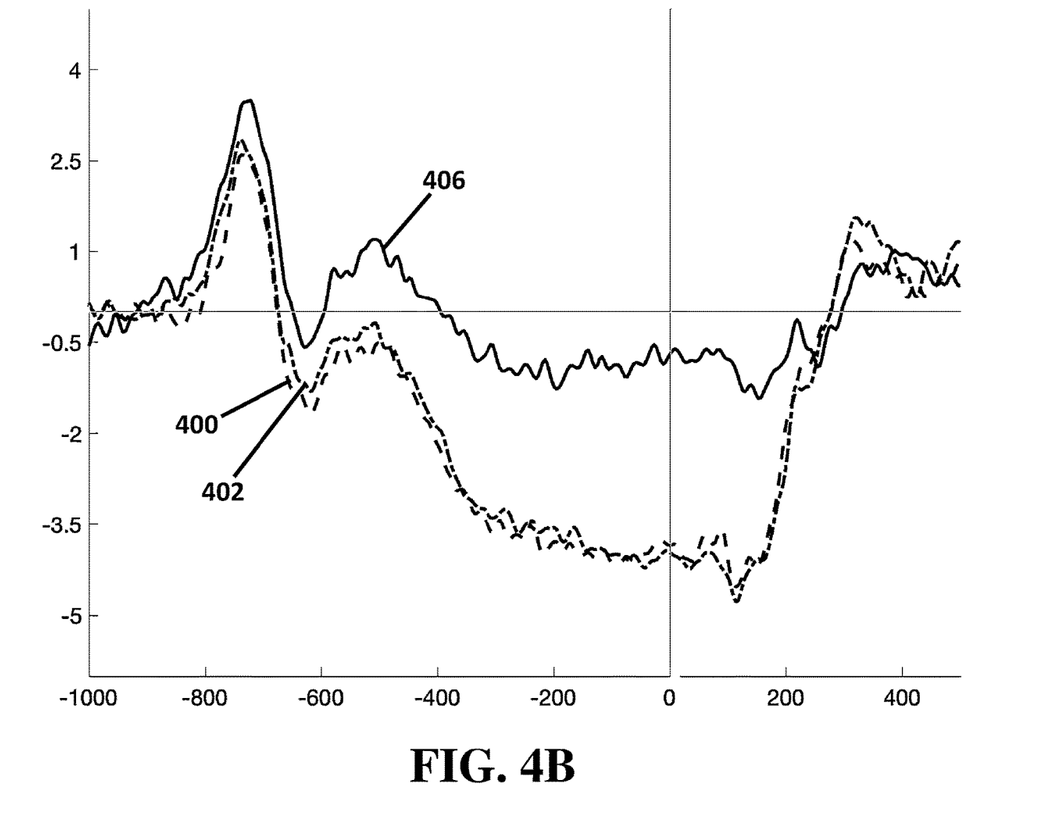

FIGS. 4A and 4B illustrate EEG graphs for selected and unselected targets, similar to the graphs (312, 314) shown in FIG. 3. The graphs show EEG signals for target interactions conducted in a test series, where users were tasked at any particular time with tasks selected from selecting numbered targets in ascending numerical order, selecting numbered targets in descending numerical order, or observing targets without selecting them, either with or without feedback when a target was fixated upon. The horizontal scale shows time in milliseconds (ms) while the vertical scale shows EEG signal in microvolts (μV). FIG. 4A contrasts the signals for selecting targets in ascending order (dashed line 400) and descending order (dash-dot line 402) with the signals for observing targets without intending to select any (solid line 404), in the case where no feedback was provided to the user. As can be seen, the signals for both cases of selecting targets (lines 400 & 402, similar to graph 314 shown in FIG. 3) track closely, and show a significant negative potential that is not present in the signals when no selection is made (line 404). Similarly, FIG. 4B contrasts the signals for selecting targets (lines 400 & 402) with the signals for observing targets without intending to select any (solid line 406), in the case where feedback was provided to the user (similar to graph 312 shown in FIG. 3). Again, the signals when no selection is made (line 406) do not show the negative potential exhibited by the signals for selecting targets (lines 400 & 402). All curves (400, 402, 404, 406) depict a Lambda wave positively peaking at about −750 ms. A Lambda wave is typically observed in the occipital region of interest during post-saccadic eye movements, and is believed to be involved in the visual processing of new information. However, for both cases of intention to select (lines 400 & 402), a significant drop in potential occurs after the Lambda wave, compared to the cases where no selection is intended (lines 404 & 406). The effect of providing feedback can be seen in that the curves where feedback was provided (lines 400, 402, & 406) all show a peak at about 300 ms that is not seen in the case of intent to only observe without selecting where feedback was not provided (line 404). The presence or absence of the anticipatory negative potential can be used to determine whether or not the user intends to select the target they are currently "fixated" on, without requiring them to take any separate action. This may also allow the system to distinguish between prolonged observation of a particular target without intending to select it from an intention to select.

In some aspects, the system may be designed to address inadvertent gaze selections. This may be achieved by leveraging the fact that users do not expect feedback when not selecting a target. Thus, these negative slow-wave potentials may serve as a passive mental switch, potentially reducing the likelihood of unintended selections.

In some embodiments, the system may be adapted for use in various computing devices, including laptops, desktops, mobile devices, or head-mounted displays. The system may also be adapted for use in assistive technology, and may provide a more accessible and intuitive method of interaction for users with physical disabilities than existing selection schemes.

The eye-tracking unit may be integrated with a display device such as a head-mounted display (HMD), and may be configured to track gaze patterns or gaze features while a user gazes at a target in the XR environment. The gaze patterns may include various features such as pupil dilation, saccade velocities, gaze velocities, fixation duration, saccade amplitudes, and micro-saccade distribution, among others. The eye-tracking device may be configured to continuously monitor the user's eye movements and capture data related to the aforementioned gaze patterns or gaze features. This data may then be processed and analyzed to understand the user's gaze behavior and intent towards the visually focused target in the XR environment.

Pupil dilation may refer to the change in the size of the user's pupil, which can be indicative of the user's level of attention or arousal. Saccade velocities may refer to the speed at which the user's eyes move from one point to another, while gaze velocities may refer to the speed at which the user's gaze shifts from one target to another. Gaze dispersion may refer to the spread of the user's gaze points over a certain period, which can provide insights into the user's level of focus or attention. Fixation duration may refer to the length of time the user's gaze remains fixed on a particular target. Pupil responses may refer to changes in the user's pupil size in response to changes in light or other stimuli. The rate of change of pupil size may provide insights into the user's cognitive load or mental effort. Saccade amplitudes may refer to the angular distance covered by the user's eyes during a saccade, while micro-saccade distribution may refer to the pattern or frequency of small, involuntary eye movements made by the user.

In some aspects, the system may track the user's neural activity by analyzing electroencephalogram (EEG) signals. The EEG signals may be captured using a brain-imaging device or neural signal capture unit, such as an EEG device, which is configured to monitor the electrical activity of the user's brain. The neural signal capture unit may be integrated with an electroencephalogram (EEG) device. This unit may be configured to capture the user's neural activity from the point the user gazes at the target. The neural activity of particular interest may be based on anticipatory negative potentials, such as Stimulus-Preceding Negativity (SPN) and/or Contingent Negative Variation (CNV). These anticipatory potentials are types of slow wave negative potentials that are evoked when the user anticipates a forthcoming stimulus.

In some cases, the neural signal capture unit may include specific EEG electrode placements in the occipitoparietal region. These placements may include, but are not limited to, O1, Oz, O2, Iz, PO7, PO3, POZ, PO4, PO8, P5, P6, P7, P8, P9, and P10 electrodes. These specific electrode placements may be chosen to capture the SPN and/or CNV signals, which are typically prominent in the occipitoparietal region of the brain. The brain-imaging device may be capable of detecting various types of neural activity, including but not limited to, anticipatory potentials). These anticipatory potentials may manifest themselves as a slow negative electrical potential in the EEG signals. The presence of these anticipatory potentials in the EEG signals may serve as an indication of the user's intent to select a target in the XR environment.

In some cases, the EEG signals may be subjected to a high-pass filter to mitigate low-frequency environmental noise. The high-pass filter may be applied to the EEG signals prior to the analysis of the anticipatory potentials. This filtering process may help to enhance the clarity and accuracy of the EEG signal analysis, thereby improving the reliability of the target selection process. The high-pass filter may be configured to allow frequencies above a certain threshold to pass through, while attenuating frequencies below this threshold. The specific threshold for the high-pass filter may be determined based on various factors, including but not limited to, the characteristics of the EEG signals, the nature of the environmental noise, and the requirements of the target selection process. In some embodiments, the system may be configured to automatically adjust the threshold of the high-pass filter based on the characteristics of the EEG signals and the environmental noise. This dynamic adjustment of the high-pass filter threshold may further enhance the clarity and accuracy of the EEG signal analysis.

In other aspects, the system may be configured to use the anticipatory negative potentials detected in the neural signals as a confirmation trigger for target selection. For instance, if the system detects an SPN or CNV in neural signals, it may interpret this as a confirmation of the user's intent to select the target. This may trigger the system to proceed with the target selection process. Conversely, if the system does not detect an SPN or CNV in the neural signals, it may interpret this as a lack of intent to select the target, and may therefore not select the target selection. This approach may help to reduce inadvertent target selections and enhance the overall usability of the XR environment.

The feedback unit of the system may be configured to provide visual feedback to the user in response to the captured neural activity and gaze patterns. This feedback may be displayed through the interactive environment of a XR system. The visual feedback may serve as a confirmation of the target selection.

In other aspects, the system may be configured to adjust the visual feedback based on the detected neural signals. For instance, if prominent negativity is detected in the neural signals, indicating an expectancy wave, the system may provide a specific type of visual feedback to confirm the target selection. Conversely, if minimal negativity is detected, indicating a lack of expectancy wave, the system may provide a different type of visual feedback or may not provide any visual feedback, thereby not selecting the user's potential target selection.

In some aspects, the system may employ a real-time prediction model to analyze the user's gaze patterns and neural activity. This model may utilize Linear Discriminant Analysis (LDA) or other suitable predictive techniques (particularly those used for binary classification) to discern patterns and relationships within the captured data. The LDA technique may be particularly effective in distinguishing between different classes of data, such as intentional target selections versus user focus on a target without intention to select it, based on the detected neural signals and gaze patterns. The system may use the predictions generated by the real-time prediction model to determine whether to select or not select a potential target selection. If the prediction model predicts an intent to select the target, based on the analyzed gaze patterns and neural activity, the system may proceed with the target selection. Conversely, if the prediction model predicts a lack of intent to select the target, the system may not select the potential target selection. This approach may help to reduce false positives in target selection.

In some cases, the LDA technique or other predictive technique may be applied to the neural signals to identify patterns indicative of anticipatory potentials, such as the SPN or CNV. The LDA technique may analyze the neural signals to determine the presence or absence of these anticipatory potentials, thereby providing insights into the user's intent to select a target. The LDA technique may also be used to classify the neural signals based on the level of negativity, with prominent negativity indicating the presence of an anticipatory potential and thus an intent to select a target.

In other cases, the LDA technique may be applied to the gaze patterns to determine evidence of intention to select based partially on the user's gaze behavior. For instance, the LDA technique may analyze the gaze patterns to provide valuable insights into the user's intent to select a target, thereby enhancing the accuracy of the target selection process. For instance, the model may identify certain gaze patterns, such as a prolonged fixation duration or a slow gaze velocity, that are associated with an intent to select a target.

In some embodiments, the real-time prediction model may be trained to classify the presence or absence of the anticipatory negative potential based on the captured gaze patterns and neural activity. The model may be trained using a variety of machine learning algorithms or other suitable predictive techniques. The training process may involve feeding the model with a large amount of data related to gaze patterns and neural activity, and then adjusting the model's parameters to minimize the difference between the model's predictions and the actual outcomes. Once trained, the model may be capable of accurately predicting the presence or absence of the anticipatory negative potential.

In some aspects, the real-time prediction model may be configured to dynamically adjust its parameters based on the characteristics of the captured gaze patterns and neural activity. This dynamic adjustment may allow the model to adapt to changes in the user's gaze behavior or neural activity. For instance, if the model detects a change in the user's gaze velocity or saccade amplitude, it may adjust its parameters to account for this change, thereby improving the accuracy of its predictions. Similarly, if the model detects a change in the user's neural activity, such as a change in the level of negativity or the presence of an anticipatory potential, it may adjust its parameters to account for this change, thereby enhancing the reliability of the target selection process.

In yet other aspects, the system may provide visual feedback to the user based on the predictions generated by the real-time prediction model. The visual feedback may be tailored to the user's predicted intent to select the target. For instance, if the prediction model predicts an intent to select the target, the system may provide a specific type of visual feedback, such as a change in the color or brightness of the target, to confirm the target selection. Conversely, if the prediction model predicts a lack of intent to select the target, the system may provide a different type of visual feedback, or may not provide any visual feedback at all, to indicate the not selection of the target selection.

In some aspects, the system may implement a biofeedback mechanism that dynamically adjusts the visual stimuli presented to the user based on the real-time assessment of the user's neural activity levels. The biofeedback mechanism may operate by continuously monitoring the user's neural activity, as captured by the brain-imaging device, and adjusting the visual stimuli presented to the user through the display in response to changes in this neural activity. For instance, if the system detects prominent negativity in the user's neural signals, indicating the growing presence of an expectancy wave such as an SPN or CNV, the biofeedback mechanism may trigger a specific type of visual or audio feedback to confirm the user's intention to select the target. Visual feedback may include, but is not limited to, changes in the color, brightness, or size of the target, or the presentation of additional visual cues or indicators. Conversely, if the system detects minimal negativity in the user's neural signals, indicating a lack of expectancy wave and thus a lack of intent to select the target, the biofeedback mechanism may adjust the visual stimuli accordingly. For example, the system may provide a different type of visual feedback, or may not provide any visual feedback at all, thereby indicating to the user that the potential target selection has been rejected.

In some cases, the biofeedback mechanism may also take into account the user's gaze patterns, as captured by the eye-tracking device, when adjusting the visual stimuli, such as when determining the type and intensity of the visual feedback to be provided. In some embodiments, the biofeedback mechanism may be configured to dynamically adapt to changes in the user's neural activity and gaze patterns over time. This dynamic adaptation may allow the biofeedback mechanism to continuously improve the visual feedback provided to the user.

In other aspects, the biofeedback mechanism may be designed to provide visual feedback that is contextually relevant and informative, to enhance the user's understanding and control over the interaction process. For example, the visual feedback may be designed to clearly indicate the current state of the target selection process, such as whether a target is currently being focused/fixated on (and thus potentially likely to be selected), whether selection of a target has been confirmed, or whether a fixated target has been not been selected (such as after fixation for a specified time without being selected).

In some aspects, the system may employ a dwell threshold for target potential selection. The dwell threshold may refer to the duration of time the user's gaze must remain fixated on a target for the target to be potentially selected. In some cases, the dwell threshold may be set between 100 milliseconds up to 5 seconds, with 750 milliseconds being a typical medium-range value. This dwell threshold may be chosen as a balanced approach, considering the challenge of detecting anticipatory negative potential such as an SPN in immersive environments. Under such a scheme, a countdown may begin when the user's gaze lands on a target. If the user's gaze remains fixated on that target for the full duration of the dwell threshold, the system may interpret this as an indication of the user's focus/fixation on the target and potential intent to select the target. At this point, the system may capturing the user's neural activity, analyzing the neural signals to confirm the intention, and provide visual feedback to the user.

In some cases, the system may distinguish between intentional selection and fixation on a target without intent to select it based on the detected neural signals and gaze patterns. For instance, if the system detects prominent negativity in the neural signals during the dwell period, it may interpret this as an indication of an anticipatory negative potential, such as an SPN or CNV, and thus an intent to select the target. Conversely, if the system detects minimal negativity in the neural signals during the dwell period, it may interpret this as a lack of lack of intent to select the target. In such cases, the system may opt not to select the target.

In some embodiments, the system may also consider the user's gaze patterns when distinguishing between intentional selection and fixation on a target without intending to select it. For example, certain gaze patterns may be indicative of the user's deliberate focus and intent to select a target, while other gaze patterns may be indicative of the user's passive viewing or lack of intent to select a target. By considering both the neural signals and the gaze patterns, the system may be able to more accurately and reliably distinguish between intentional selections and fixations without intention to select the fixated target.

In some aspects, the system may be designed to adapt to the user's familiarity with target locations in the XR environment. As users interact with the XR environment over time, they may become more familiar with the locations of various targets. This familiarity may influence the user's anticipatory neural activity, as well as their gaze patterns, when they gaze at a target. For instance, as users become more familiar with the target locations, they may anticipate the forthcoming stimulus more quickly, potentially leading to a quicker manifestation of the anticipatory negative potential. This quicker manifestation of the anticipatory negative potential may be detected by the neural signal capture unit. The system may then use this information to adjust the dwell threshold or the visual feedback provided to the user.

In some cases, the system may employ machine learning algorithms or other predictive techniques to analyze the effect of user familiarity with target locations on anticipatory negative potential manifestation. The system may analyze the neural signals and gaze patterns captured over time to identify patterns or trends associated with increased familiarity with target locations. For example, the system may detect changes in the timing or amplitude of the anticipatory negative potential, or changes in the user's gaze velocity, saccade amplitude, or fixation duration, that are indicative of increased familiarity with target locations.

In other aspects, the system may dynamically adjust its parameters based on the user's familiarity with target locations. For instance, the system may adjust the dwell threshold, the parameters of the prediction model, or the type or intensity of the visual feedback, based on the user's familiarity with target locations. This dynamic adaptation may allow the system to continuously improve the target selection process based on the user's familiarity with target locations.

In yet other aspects, the system may provide visual feedback that is tailored to the user's familiarity with target locations. For example, the system may provide more subtle or nuanced visual feedback for users who are more familiar with the target locations, as these users may require less explicit feedback to confirm their target selections. Conversely, the system may provide more explicit or pronounced visual feedback for users who are less familiar with the target locations, to assist them in navigating the XR environment and making target selections.

In some aspects, the system may integrate gaze patterns with neural signals to enhance the accuracy of target selection and reduce false positives. This integration may involve analyzing both the gaze patterns and the neural activity, as captured by the neural signals, in a concurrent manner.

In some aspects, the system may employ real-time processing and analysis of the captured neural and eye-tracking data to enable rapid and accurate target selection. This real-time processing and analysis may involve continuously monitoring the user's neural activity and gaze patterns, and dynamically adjusting the system's parameters based on the detected neural signals and gaze features. For instance, the system may adjust the dwell threshold, the parameters of the prediction model, or the type or intensity of the visual feedback, based on the detected neural signals and gaze patterns. This real-time processing and analysis may allow the system to respond promptly to changes in the user's gaze behavior or neural activity.

In some cases, the system may employ statistical analysis or test (such as a cluster-based permutation test, for one example) to measure statistical significance of the neural data. Such test may be a non-parametric statistical test that can be used to identify significant differences between two or more groups of data. In the context of the present system, such test may be used to identify significant differences in the neural signals associated with different types of interactions, such as intentional selections versus fixation without intention to select.

In one example, a cluster-based permutation test may involve grouping the neural data into clusters based on certain criteria, such as the amplitude or frequency of the neural signals, and then randomly permuting the labels of the clusters to generate a null distribution. The test statistic may be the sum of the neural signal values within each cluster, and the p-value may be the proportion of permutations that result in a test statistic greater than or equal to the observed test statistic. If the p-value is less than a predetermined significance level, the system may conclude that there is a significant difference in the neural signals associated with the different types of interactions.

The statistical test could be applied to the neural signals captured during the dwell period, which is the duration of time the user's gaze must remain fixed on a target for the target to be selected. The test may be used to identify significant differences in the neural signals associated with intentional selections and fixations without intent to select during the dwell period. For instance, the test may identify prominent negativity in the neural signals associated with intentional selections, indicating the presence of an expectancy wave such as an SPN or CNV. Conversely, the test may identify minimal negativity in the neural signals associated with fixations on a target without intention to select it, indicating a lack of expectancy wave and thus a lack of intent to select the target.

In other aspects, statistical tests such as a cluster-based permutation test may be used in conjunction with the real-time prediction model to enhance the accuracy of target selection. For example, the statistical test may be used to identify significant differences in the neural signals associated with different types of interactions, and these differences may be used as input features for the prediction model. The prediction model may then use these features to predict the user's intent to select a target.

In some aspects, the system may include a user interface within the XR environment that allows for visual representation of selections. The user interface may be designed to visually indicate the user's current visual focus, which may act as a cursor. For instance, when the user's gaze lands on a target, the target may change its color or brightness, or display other visual cues, to indicate that it is currently being "fixated" on by the user. This visual indication may provide the user with immediate feedback about their gaze behavior and may indicate a potential target selection. In some cases, the user interface may also visually represent the confirmation of a target selection. For example, once the user's gaze remains fixed on a target and the system detects an expectancy wave in the user's neural signals, the target may change its color, brightness, or size, or display additional visual cues, to indicate that the target has been selected. This visual confirmation of target selection may provide the user with clear and immediate feedback about the outcome of their interaction.

In other aspects, the user interface may visually represent when a target upon which the user's vision has focused is not selected. For instance, if the user's gaze shifts away from a target before the dwell threshold is reached, or if the system does not detect an expectancy wave in the user's neural signals, the target may revert to its original color, brightness, or size, or display other visual cues, to indicate that the particular target has not been selected. This visual indication of non-selection may provide the user with immediate feedback about their interaction.

In some embodiments, the user interface may be designed to dynamically adjust the visual representation of selections based on the user's gaze patterns and neural activity. For example, the user interface may adjust the intensity or duration of the visual cues based on the user's gaze velocity, saccade amplitude, fixation duration, or other gaze pattern features. Similarly, the user interface may adjust the visual cues based on the level of negativity detected in the user's neural signals. This dynamic adjustment of the visual representation of selections may allow the user interface to provide more nuanced and contextually relevant feedback to the user.

In some aspects, the system may be employed in a variety of XR scenarios to provide target selection. For instance, the system may be used in virtual reality (VR) games, where users need to select various objects or targets within the game environment. By leveraging the user's gaze patterns and neural activity, the system may enable users to select targets in the game simply by gazing at them and anticipating the selection.

In other cases, the system may be utilized in augmented reality (AR) applications, such as AR-based learning or training programs. In these applications, users may need to select various virtual elements overlaid on the real-world environment. The system may facilitate this selection process by tracking the user's gaze patterns and neural activity, and providing visual feedback based on the detected anticipatory potentials.

In yet other aspects, the system may be employed in mixed reality (MR) environments, which combine elements of both VR and AR. In these environments, users may interact with a blend of real and virtual objects. The system may facilitate the selection of these objects by tracking the user's gaze patterns and neural activity, and providing visual feedback based on the detected anticipatory potentials. This may enable users to seamlessly interact with both real and virtual objects within the MR environment.

In some embodiments, the system may be adapted for use in various other XR scenarios, such as virtual tours, remote collaboration, telemedicine, and others. In these scenarios, users may need to select various targets or elements within the XR environment. The system may facilitate this selection process by leveraging the user's gaze patterns and neural activity.

In some aspects, the system may be designed to address specific challenges associated with gaze-based interactions in XR environments and other display environments. One such challenge is the 'Midas touch' problem, which refers to the difficulty of distinguishing between a user's intentional gaze at a target for selection and a user's spontaneous gaze at a target without the intent to select. This problem can lead to inadvertent target selections, disrupting the user's interaction experience. To address the 'Midas touch' problem, the system may leverage the user's neural activity, such as anticipatory negative potentials such as the SPN or CNV, as a confirmation trigger for target selection. When the user gazes at a target with the intent to select, the anticipation of the forthcoming stimulus may evoke an anticipatory negative potentials such as SPN or CNV, which manifests as a slow negative electrical potential in the neural signals. The system, upon detecting this negativity, may interpret it as a confirmation of the user's intent to select the target, thereby mitigating inadvertent target selections.

In some cases, the system may also incorporate gaze patterns, such as fixation duration, saccade amplitude, gaze velocity, and others, to further enhance the accuracy of target selection. For instance, the system may recognize certain gaze patterns, such as a prolonged fixation duration or a slow gaze velocity, as indicative of the user's intent to select a target. By integrating both gaze patterns and neural activity, the system may be able to more accurately distinguish between intentional selections and spontaneous fixations on a target, thereby effectively addressing the 'Midas touch' problem.

In other aspects, the system may be designed to minimize the cognitive load on the user during the interaction process. Traditional gaze-based interactions often require the user to consciously engage in the selection process by a separate physical selection action, which can be cognitively demanding and potentially lead to user fatigue. However, the system disclosed herein may avoid the need for users to consciously engage in the selection process by leveraging the user's inherent neural signatures based on experience and intent as the primary mode of interaction. In particular, the system may use neural signals, such as anticipatory negative potentials such as the SPN or CNV, as a passive confirmation trigger for target selection. This means that the user no longer has to make a deliberate action, such as a physical click or a conscious mental command, to confirm the selection. Instead, the user's anticipation of the forthcoming stimulus, as reflected in the anticipatory negative potential, serves as a passive mental switch for target selection. This passive mechanism may not only simplify the interaction process but also reduce the cognitive load on the user.

In some aspects, the system may be calibrated and personalized to individual users for better performance. This calibration process may involve adjusting various parameters of the system based on the individual user's specific gaze patterns and neural activity. For instance, the system may adjust the criteria for identifying an anticipatory negative potential, the parameters of the prediction model, and/or the type or intensity of the visual feedback based on the user's gaze pattern features and/or the level of negativity detected in the user's neural signals, which may be indicative of anticipatory negative potentials such as an SPN or CNV. In some cases, the calibration process may involve a training phase, during which the user interacts with the XR environment and the system captures the user's gaze patterns and neural activity. The system may then analyze this data to identify patterns and relationships that are indicative of the user's intent to select a target. These patterns and relationships may be used to train the real-time prediction model.

In other cases, the calibration process may involve a personalization phase, during which the system adjusts its parameters to match the user's specific gaze patterns and neural activity. For instance, the system may adjust the dwell threshold based on the user's typical fixation duration, or adjust the parameters of the prediction model based on the user's typical gaze velocity or saccade amplitude. This personalization phase may allow the system to tailor the interaction experience to the individual user.

In yet other aspects, the system may continuously update its calibration and personalization based on ongoing user interactions. For example, the system may continuously monitor the user's gaze patterns and neural activity, and dynamically adjust its parameters based on the detected changes. This continuous calibration and personalization may allow the system to adapt to changes in the user's gaze behavior or neural activity over time.

In some aspects, the system may be enhanced by incorporating additional biosignals into the interaction process. For instance, the system may be configured to capture and analyze other types of neural activity, such as event-related potentials (ERPs), slow cortical potentials (SCPs), or brain oscillations, in addition to the anticipatory potentials such as the SPN or CNV. These additional biosignals may provide further insights into the user's cognitive state, attention level, or emotional state. For example, the system may use ERPs, which are time-locked responses to specific sensory, cognitive, or motor events, to detect the user's reactions to various stimuli in the XR environment. Similarly, the system may use SCPs, which are slow changes in the brain's electrical activity, to monitor the user's cognitive workload or mental effort during the interaction process. Furthermore, the system may use brain oscillations, which are rhythmic or repetitive neural activity in the central nervous system, to assess the user's attention level or emotional state. By integrating these additional biosignals with the gaze patterns and anticipatory potentials, the system may be able to provide a more comprehensive and nuanced understanding of the user's intent to select a target. Electrooculogram (EOG) signals, known for their temporal precision, may be used to reduce ocular artifacts in the neural signal data and hence may improve classification accuracy.

In other aspects, the system may be adapted to different XR platforms to cater to a wide range of applications and use cases. For instance, the system may be configured to work with various types of head-mounted displays (HMDs), such as virtual reality (VR) headsets, augmented reality (AR) glasses, or mixed reality (MR) headsets. The system may also be compatible with different types of eye-tracking devices, brain-imaging devices, and computing mediums.

In some cases, the system may be designed to support different interaction techniques or modalities, such as gesture-based interactions, voice commands, or haptic feedback, in addition to gaze-based interactions. These additional interaction techniques or modalities may provide users with more options and flexibility in how they interact with the XR environment.

In yet other aspects, the system may be enhanced with machine learning algorithms or artificial intelligence (AI) technologies, such as in a real-time prediction model, to improve its predictive accuracy and responsiveness. For instance, the system may employ deep learning algorithms, reinforcement learning algorithms, transformer models, or other advanced machine learning techniques to analyze the captured gaze patterns and neural activity. These advanced algorithms may be capable of identifying complex patterns or relationships within the data. Furthermore, the system may use AI technologies to dynamically adapt its parameters and feedback mechanisms based on the user's ongoing interactions, such as to provide a more personalized and responsive interaction experience in the XR environment.

A number of implementations have been described. Nevertheless, it will be understood that various modifications may be made without departing from the spirit and scope of the disclosure. Accordingly, other implementations are within the scope of the following claims.

As this invention is susceptible to embodiments of many different forms, it is intended that the present disclosure be considered as an example of the principles of the invention and not intended to limit the invention to the specific embodiments shown and described.

In some embodiments the method or methods described above may be executed or carried out by a computing system including a tangible computer-readable storage medium, also described herein as a storage machine, that holds machine-readable instructions executable by a logic machine (i.e. a processor or programmable control device) to provide, implement, perform, and/or enact the above described methods, processes and/or tasks. When such methods and processes are implemented, the state of the storage machine may be changed to hold different data. For example, the storage machine may include memory devices such as various hard disk drives, CD, or DVD devices. The logic machine may execute machine-readable instructions via one or more physical information and/or logic processing devices. For example, the logic machine may be configured to execute instructions to perform tasks for a computer program. The logic machine may include one or more processors to execute the machine-readable instructions. The computing system may include a display subsystem to display a graphical user interface (GUI) or any visual element of the methods or processes described above. For example, the display subsystem, storage machine, and logic machine may be integrated such that the above method may be executed while visual elements of the disclosed system and/or method are displayed on a display screen for user consumption. The computing system may include an input subsystem that receives user input. The input subsystem may be configured to connect to and receive input from devices such as a mouse, keyboard or gaming controller. For example, a user input may indicate a request that certain task is to be executed by the computing system, such as requesting the computing system to display any of the above-described information, or requesting that the user input updates or modifies existing stored information for processing. A communication subsystem may allow the methods described above to be executed or provided over a computer network. For example, the communication subsystem may be configured to enable the computing system to communicate with a plurality of personal computing devices. The communication subsystem may include wired and/or wireless communication devices to facilitate networked communication. The described methods or processes may be executed, provided, or implemented for a user or one or more computing devices via a computer-program product such as via an application programming interface (API).

Since many modifications, variations, and changes in detail can be made to the described embodiments of the invention, it is intended that all matters in the foregoing description and shown in the accompanying drawings be interpreted as illustrative and not in a limiting sense. Furthermore, it is understood that any of the features presented in the embodiments may be integrated into any of the other embodiments unless explicitly stated otherwise. The scope of the invention should be determined by the appended claims and their legal equivalents.

In addition, the present invention has been described with reference to embodiments, it should be noted and understood that various modifications and variations can be crafted by those skilled in the art without departing from the scope and spirit of the invention. Accordingly, the foregoing disclosure should be interpreted as illustrative only and is not to be interpreted in a limiting sense. Further it is intended that any other embodiments of the present invention that result from any changes in application or method of use or operation, method of manufacture, shape, size, or materials which are not specified within the detailed written description or illustrations contained herein are considered within the scope of the present invention.

Insofar as the description above and the accompanying drawings disclose any additional subject matter that is not within the scope of the claims below, the inventions are not dedicated to the public and the right to file one or more applications to claim such additional inventions is reserved.

While this invention has been described with respect to at least one embodiment, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A human-computer interface system for selecting a target presented on a display, the system comprising:
    an eye-tracking unit configured to capture gaze patterns of a user;
    a neural signal capture unit configured to detect neural signals dependent on brain electrical activity from the user; and
    a processing unit configured to:
        analyze the gaze patterns to identify user fixation on a particular displayed target,
        analyze the neural signals to identify an anticipatory negative potential associated with the user's intent to select the particular target; and
        initiate a target selection of the particular target based, at least partially, on the identified anticipatory negative potential;
    wherein said processing unit is further configured to employ a real-time prediction model to analyze the gaze patterns and neural signals to predict an intention to select the particular target, and to initiate a target selection of the particular target based at least partially on the predicted intention to select; and
    wherein the anticipatory negative potential comprises at least one pattern selected from the group of a Stimulus-Preceding Negativity (SPN) and a Contingent Negative Variation (CNV).

2. The system of claim 1 wherein the gaze patterns comprise at least one dynamic selected from the group of gaze coordinates, gaze direction, gaze origin vectors, pupil dilation/constriction rate, saccade velocity, gaze velocity, fixation duration, saccade amplitude, and micro-saccade distribution.

3. The system of claim 1, further comprising a feedback unit configured to provide feedback to the user in response to the initiated target selection, the feedback including at least one feedback from the group of visual feedback, audio feedback, and tactile/haptic feedback.

4. The system of claim 3, wherein the feedback comprises a change in at least one visual characteristic of the selected target.

5. The system of claim 1 wherein said processing unit is further configured to allow de-selection of a previously selected target.

6. A method for selecting a target presented on a display, comprising the steps of:
    capturing gaze patterns of a user using an eye-tracking unit;
    detecting neural signals of the user using a neural signal capture unit;
    analyzing the gaze patterns and neural signals to identify an anticipatory negative potential associated with the user's intent to select a particular target; and
    initiating a target selection of the particular target based, at least partially, on the identified anticipatory negative potential; and
    employing a real-time prediction model to analyze the gaze patterns and neural signals to predict an intention to select the particular target, and to initiate a target selection of the particular target based at least partially on the predicted intention to select;
    wherein the anticipatory negative potential comprises at least one pattern selected from the group of a Stimulus-Preceding Negativity (SPN) and a Contingent Negative Variation (CNV).

7. The method of claim 6, wherein the gaze patterns comprise at least one dynamic selected from the group of gaze coordinates, gaze direction, gaze origin vectors, pupil dilation/constriction rate, saccade velocity, gaze velocity, fixation duration, saccade amplitude, and micro-saccade distribution.

8. The method of claim 6, further comprising providing feedback to the user in response to the initiated target selection, the feedback including at least one feedback from the group of visual feedback, audio feedback, and tactile/haptic feedback.

9. The method of claim 8, wherein the feedback comprises a change in at least one visual characteristic of the selected target.

10. The method of claim 6 further comprising the step of:
    responsive to input from the user, canceling said step of initiating a target selection, wherein said input includes at least one input selected from the group of deliberate input entered by action of the user and neural signals indicating a false positive.

11. A non-transitory computer-readable medium storing instructions that, when executed by a processor, cause the processor to perform a method for selecting a target presented on a display, the method comprising the steps of:
    receiving gaze patterns of a user from an eye-tracking unit;
    receiving neural signals of the user from a neural signal capture unit;
    analyzing the gaze patterns and neural signals to identify an anticipatory negative potential associated with the user's intent to select a particular target; and
    initiating a target selection of the particular target based, at least partially, on the identified anticipatory negative potential;
    wherein said processor employs a real-time prediction model to analyze the gaze patterns and neural signals to predict an intention to select the particular target, and to initiate a target selection of the particular target based at least partially on the predicted intention to select; and
    wherein the anticipatory negative potential comprises at least one pattern selected from the group of a Stimulus-Preceding Negativity (SPN) and a Contingent Negative Variation (CNV).

12. The non-transitory computer-readable medium of claim 11, wherein the gaze patterns comprise at least one dynamic selected from the group of gaze coordinates, gaze direction, gaze origin vectors, pupil dilation/constriction rate, saccade velocity, gaze velocity, fixation duration, saccade amplitude, and micro-saccade distribution.

13. The non-transitory computer-readable medium of claim 11, wherein the method further comprises providing feedback to the user in response to the initiated target selection, the feedback including at least one feedback from the group of visual feedback, audio feedback, and tactile/haptic feedback.

14. The non-transitory computer-readable medium of claim 13, wherein the feedback comprises a change in at least one visual characteristic of the selected target.

\* \* \* \* \*